Fig. 1

INVENTOR
Ambrose E. Zierick

Fig.2

July 14, 1959     A. E. ZIERICK     2,894,369
HYDRAULIC CLUTCH AND TURBINE DRIVE Filed Feb. 7, 1955     7 Sheets-Sheet 3

INVENTOR
Ambrose E. Zierick

July 14, 1959  A. E. ZIERICK  2,894,369
HYDRAULIC CLUTCH AND TURBINE DRIVE
Filed Feb. 7, 1955  7 Sheets-Sheet 4

INVENTOR
Ambrose E. Zierick

July 14, 1959          A. E. ZIERICK          2,894,369

HYDRAULIC CLUTCH AND TURBINE DRIVE

Filed Feb. 7, 1955          7 Sheets-Sheet 6

INVENTOR
Ambrose E. Zierick

United States Patent Office 2,894,369
Patented July 14, 1959

2,894,369

HYDRAULIC CLUTCH AND TURBINE DRIVE

Ambrose E. Zierick, Bronx, N.Y.

Application February 7, 1955, Serial No. 486,559

10 Claims. (Cl. 60—54)

My invention relates to certain new and useful improvements in hydraulic clutches in which the output speed of the driven element is varied by finger-tip control mechanism.

With the above basic object in view, this invention is adaptable for use principally in the automotive field, such as in motorcycles, automobiles, trucks, tractors, tanks, bulldozers, farm equipment, etc., but also finds use in portable electric drills, electric motors for power presses, automatic machines, machine tools and their feeds, textile machinery, and, in general, all types of variable speed transmissions.

The principal object of my invention is to provide an improved variable speed hydraulic clutch device of the character described which will be simpler, more efficient and longer wearing. Other objects, features and advantages of my invention will be apparent from the following description when read with reference to the accompanying drawings, illustrating one form in which the invention may conveniently be embodied in practice.

In the drawings, wherein like reference numerals denote corresponding parts throughout the several views.

Figure 1:
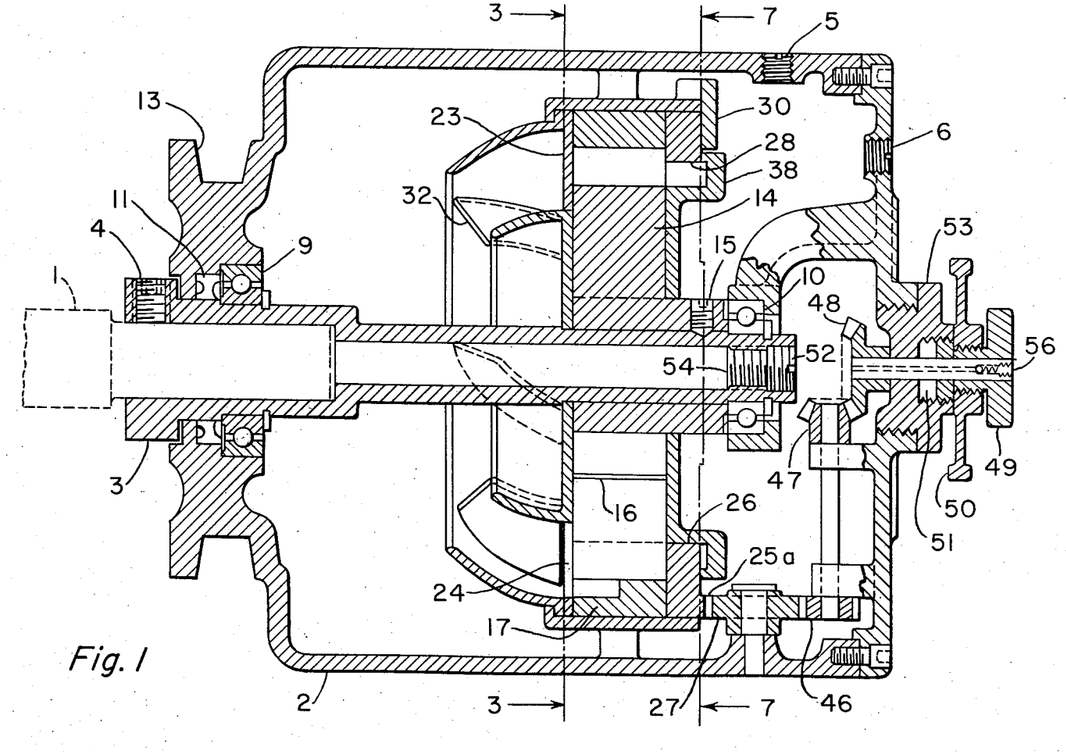
Fig. 1 is a longitudinal cross-section of one embodiment of the invention.
Figure 2:
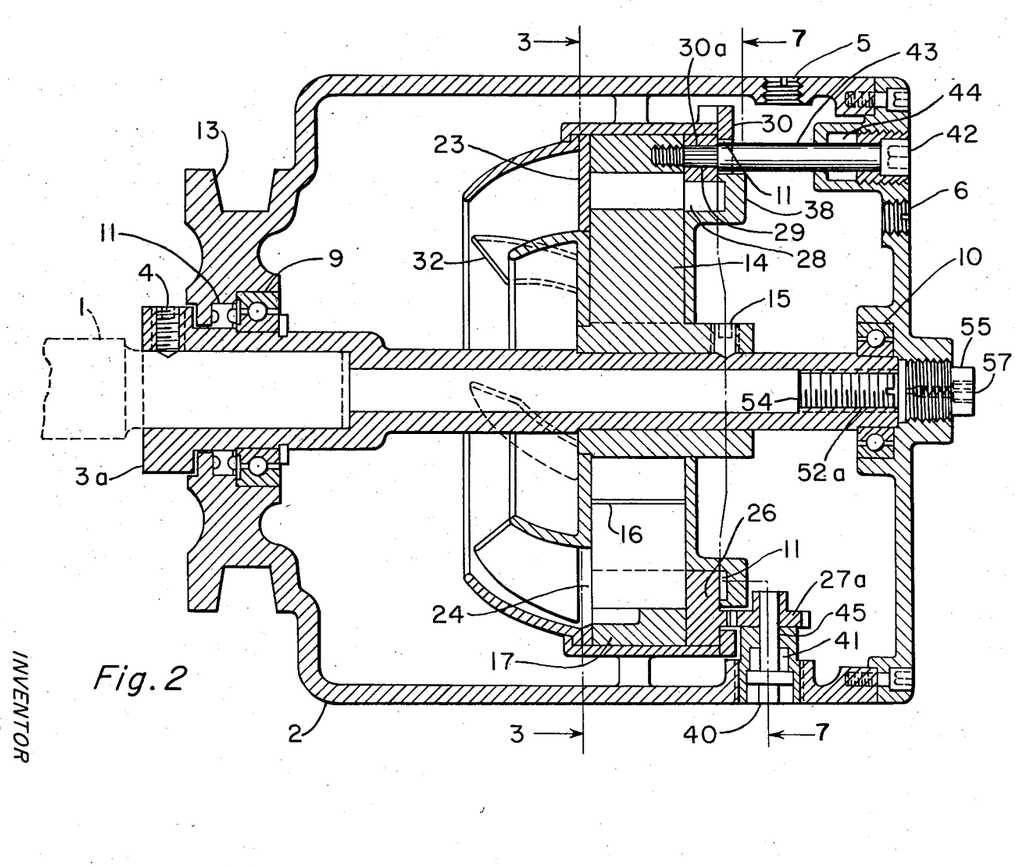
Fig. 2 is a similar cross-section of a modified embodiment of the invention.

Referring now in detail to Fig. 1 and Fig. 2, the shaft 1 represents the drive shaft of an electric motor, not illustrated, which is the prime source of power. Drive shaft 1 supports a hydraulic vessel 2, which is rotatively carried on a spindle 3 through ball bearings 9 and 10. Drive shaft 1 and spindle 3 are suitably affixed together as by a light press fit locked by set screw 4. Thus the drive shaft 1 and spindle 3 will rotate as a unitary structure. Adjacent to ball bearing 9, Figs. 1 and 2, an oil retainer 11 is disposed to prevent hydraulic fluid from escaping from vessel 2.

The hydraulic vessel 2 is normally more than half full of hydraulic fluid injected through the aperture occupied by removable screw plug 5, the level of which fluid is controlled conveniently when filling by means of an overflow aperture occupied by a removable screw plug 6.

Drive shaft 1 and spindle 3 operate at a constant speed at all times, and through means hereinafter described rotate hydraulic vessel 2 at a speed regulated by a combined hydraulic and mechanical device.

The principal function of the hydraulic vessel 2 is to convert the input power torque derived from drive shaft 1 into any desired predetermined speed of the output or takeoff V-pulley 13 coaxially formed on said vessel.

Figure 3:
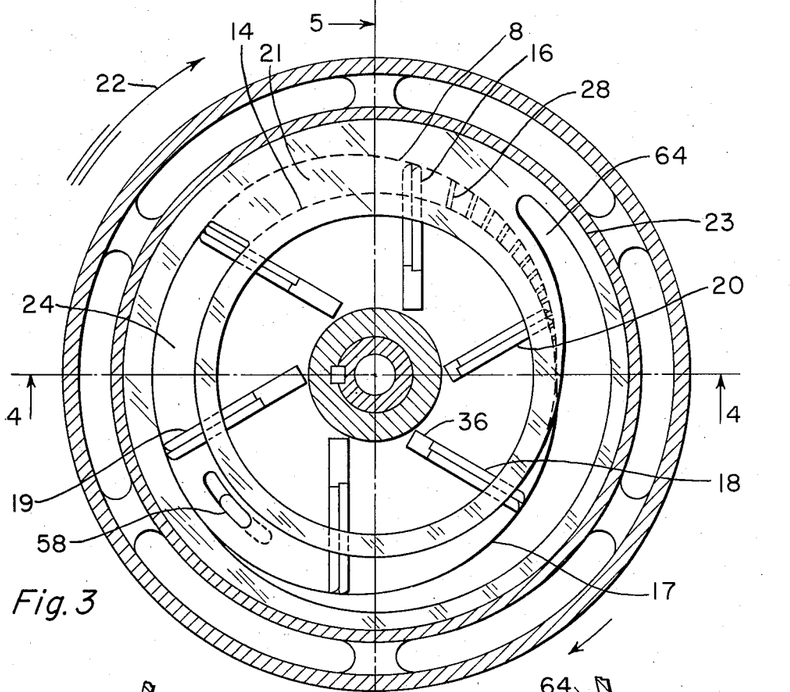
Fig. 3 is a cross-section along the line 3—3, Fig. 1 or Fig. 2, taken in the direction of the arrows.
Figure 9:
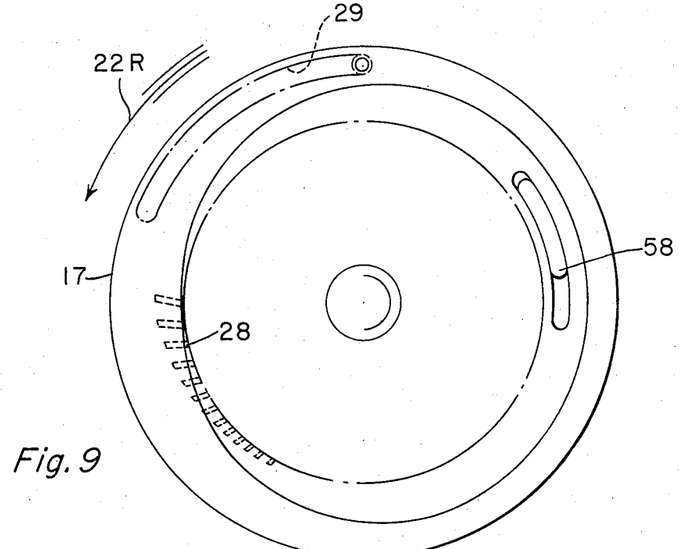
Fig. 9 is a face view of a cam employed in the forms of the invention illustrated in Figs. 1 and 2.

This will be apparent from Figs. 1 and 3, wherein the radial rotor 14, driven in fixed relation to spindle 3 by being secured thereto with a screw 15, in its rotation carries radially slidable vanes 16, the latter traveling circumferentially within a cam ring 17 (see also Fig. 9). The centrifugal force induced by rapid rotation of the rotor 14 causes the vanes to slide outwardly into sliding engagement with the internal face of the cam ring 17. The cam ring 17 is preferably of either case-hardened steel or is of nylon composition, and is press-fitted into the hydraulic vessel 2 in a suitable manner. The hydraulic vessel 2 is preferably of die cast aluminum.

As depicted in Fig. 3, it is further apparent that in each clockwise revolution of the radial rotor 14 the vanes 16 are induced to slidably reciprocate between positions designated by 18, 19 and 20. Since the space 21, Fig. 3, is confined on each side by additional elements, which are hereafter described, upon said clockwise revolution, a compression of any fluid or medium confined therein may be obtained.

Such compression is sufficient to transmit clockwise torque from the radial rotor to the cam ring 17 secured within the hydraulic vessel 2, thereby inducing rotation of the latter.

When the hydraulic fluid is solidly compressed within space 21, so that there is no bleeding or escape thereof, cam ring 17 and vessel 2, within which said ring is securely mounted, are caused to rotate at a speed corresponding to that of drive shaft 1 and its affixed rotor 14.

When the hydraulic fluid is in a semi-compressed state, in order to confine it within space 21, a port disc 23, shown in Figs. 1, 2 and 3, seals off one side of the compression space, except at arcuate port opening 24, best viewed in Fig. 3, but also seen in Figs. 1 and 2, through which charging takes place the amount of which is dependent upon the particular speed differential existing between rotor 14 and ring cam 17.

Figures 10, 11, 12:
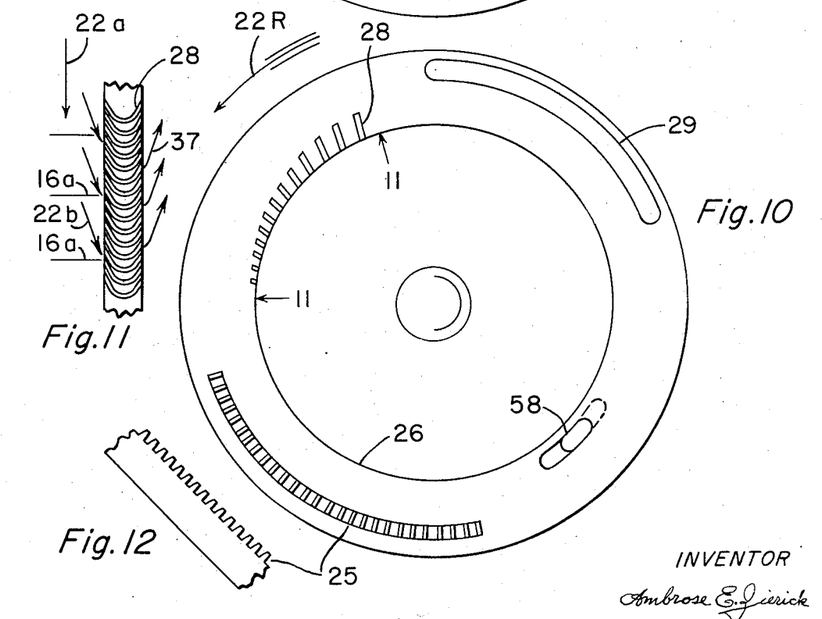
Fig. 10 is a detail face view of the turbine ring.
Fig. 11 is a diagrammatic cross-section of turbine blading taken along the line 11—11, Fig. 10.
Fig. 12 is a fragmentary profile view of the gear rack forming a portion of the turbine ring shown in Fig. 10.

Adjacent to the opposite side of the compression space 21, is disposed a circular retaining wall or turbine ring 26, as shown in Fig. 1 and Fig. 2. Referring to Fig. 10, the ring 26 embodies the turbine blades 28, which are also depicted in Figs. 1, 2, 3 and 11. An integral arcuate, segmental gear rack 25, shown partly in detail in Fig. 12, forms a part of ring 26. An arcuate slot 29 is disposed diametrically opposite said rack and is engaged by a stop screw 30a, as shown in Fig. 2.

Up to this point Figs. 1 and 2 have substantially similar construction details.

In both Figs. 1 and 2 the turbine ring 26 is rotatable through approximately ninety degrees by the rack 25 meshing with a pinion 27 and 27a, respectively. A retaining ring 30, Fig. 7, secured by screws 31 to an internal circumferential flange integral with vessel 2, holds the turbine ring 26 in precisely confined, freely rotatable position whereby speed adjustment may be obtained.

With the foregoing arrangement, in order to vary speed it is necessary to induce a bleeding of the semi-compressed fluid confined within space 21 in cooperation with the charging pressure of the aforesaid vanes.

Figures 13, 14:
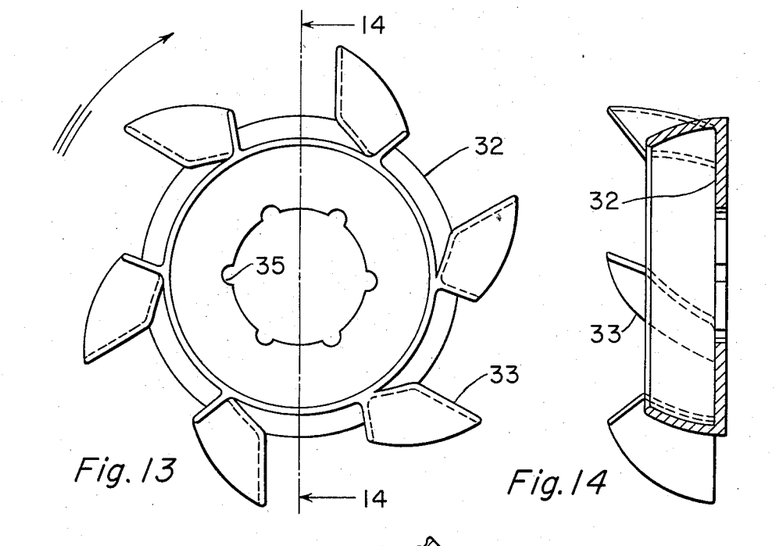
Fig. 13 is a detail face view of the scoop impeller.
Fig. 14 is a longitudinal cross-section of Fig. 13 taken along the line 14—14 thereof in the direction of the arrows.

In Figs. 1 and 2, a rotatable centrifugal scoop impeller 32, shown in detail in Fig. 13 and Fig. 14, is provided with a series of scoop blades 33 which are fixedly aligned with vanes 16 on radial rotor 14. The function of the scoop blades 33 is to scoop and deflect the hydraulic fluid and deliver it through port 24, readily seen in Figs. 1, 2 and 3. The scoop impeller 32 being securely fastened to radial rotor 14, also serves to confine the radial vanes 16 in their sliding position, as seen in Figs. 1 and 2.

Recesses 35 (Fig. 13) are located in alignment with the adjacent vanes 16 which slide in slots 36 (Fig. 3) to permit air to escape from the vane slots and prevent pocketing of compressed air.

As seen in Fig. 3, port disc 23 is disposed frontally of the rotor 14, and the turbine blades 28 are disposed rearwardly of rotor 14. Thus, when bleeding is in effect, the hydraulic fluid will impinge and react against the turbine blades.

The turbine blades 28 mounted on turbine wheel 26 (Fig. 8) guide the emerging hydraulic fluid against the saw-tooth ducts 39 formed in a turbine wheel 38 which is secured to and encloses the rearward side of the rotor 14. The turbine wheel 38 acts as an additional valve which controls the rate of flow of the hydraulic fluid from the vane slots, the output speed of the vessel 2 being a function of this rate of flow.

Figure 7:
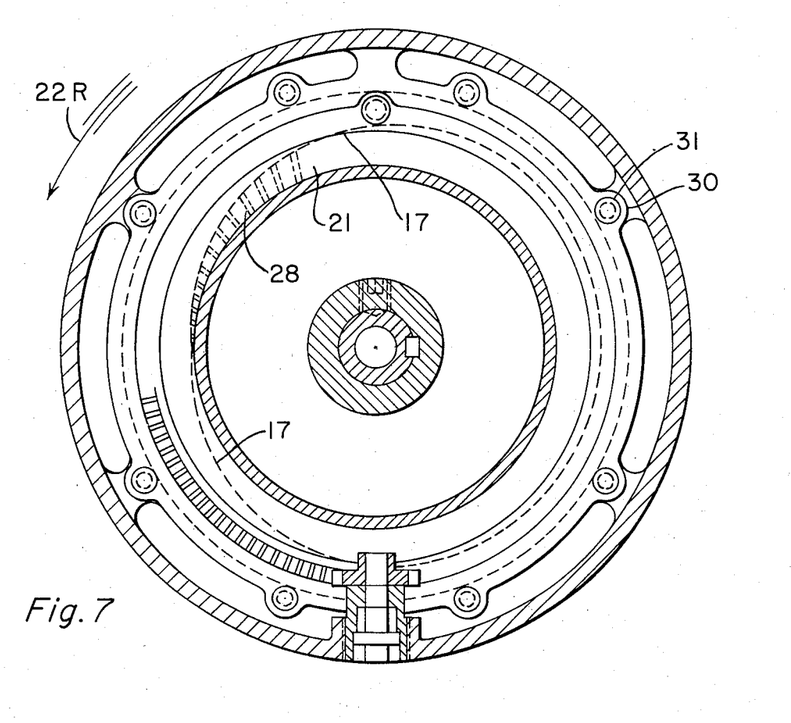
Fig. 7 is a cross-section taken along the broken line 7—7, Fig. 2 in the direction of the arrows, and also represents a cross-section taken on line 7—7 of Fig. 1.

It is clear that effective regulation or control of hydraulic pressure such as is induced by the aforesaid bleeding effect of the semi-compressed fluid will accomplish variation of the output speed of discharge V-pulley 13. This control is obtained by varying the amount of turbine blading exposed to the space 21 (Fig. 3). For instance, Fig. 3 shows all the turbine blading 28 disposed adjacent to the space 21. It will be noted that Fig. 7 shows the same relation between space 21, cam ring 17 and turbine blading 28. With the above relationship of turbine blading, the output speed of V-pulley 13 is at its lowest, with a maximum corresponding torque.

A speed increase may be obtained by slowly adjusting turbine ring 26 (Fig. 10) circularly in the direction of arrow 22R, which is discernible in Fig. 7. This increase may be gradually continued as the turbine ring 26 is further rotatively adjusted counterclockwise, up to the limit of its adjustment, at which point full speed is attained. At this position the turbine blading is no longer exposed to the space 21, as in Fig. 9, showing turbine blading 28 superimposed on cam ring 17. This is the high speed position, which exists in both Figs. 1 and 2.

In Fig. 2 the speed adjustment is readily obtained with rack 25, Fig. 10, actuated by pinion 27a, integral with spindle 45. A key is inserted at spindle recession 40. An additional key is used at 42 for locking the turbine ring in position with locking screw 43, through slot 29, to prevent slipping from one speed to another. Seal packings 41 and 44 are shown in position in both instances to prevent leakage.

In Fig. 1 the speed adjustment is readily obtained with a similar rack 25a, actuated by intermediate gear 27, pinion 46, and bevel gearing 47 and 48 engaged with regulating knob 49. To prevent speed from slipping, locking wheel 50 is screwed tight. At 51 seal packing is disposed to prevent leakage. A screw plug 52 is inserted to prevent leakage through the hollow spindle 3, blocking seepage past drive shaft 1.

In both Figs. 1 and 2 hollow spindle shafts 3 and 3a allow a long jack screw to be inserted therethrough for pushing the entire device from motor drive shaft 1. Thus, in Fig. 1 screw plug 52 and bushing 53 are removed, the latter removing bevel gear 48, permitting a jack screw to be engaged with thread 54 for pushing off the unit.

In Fig. 2 a screw plug 52a is likewise inserted to prevent leakage through the hollow spindle 3a and block seepage past motor drive shaft 1. When screw plugs 52a and 55 are removed, it is also possible to use a long jack screw to push off the unit by engaging the screw jack with the thread 54 through the hollow shaft. The jack screw must be long enough to exert continuous contact pressure against motor drive shaft 1.

In both Figs. 1 and 2 air vents 56 and 57 are disposed to leak air through to the atmosphere, when pressures within vessel 2 are in excess of one pound, these vents being set to operate at the said predetermined pressure.

Figures 15, 16, 17:
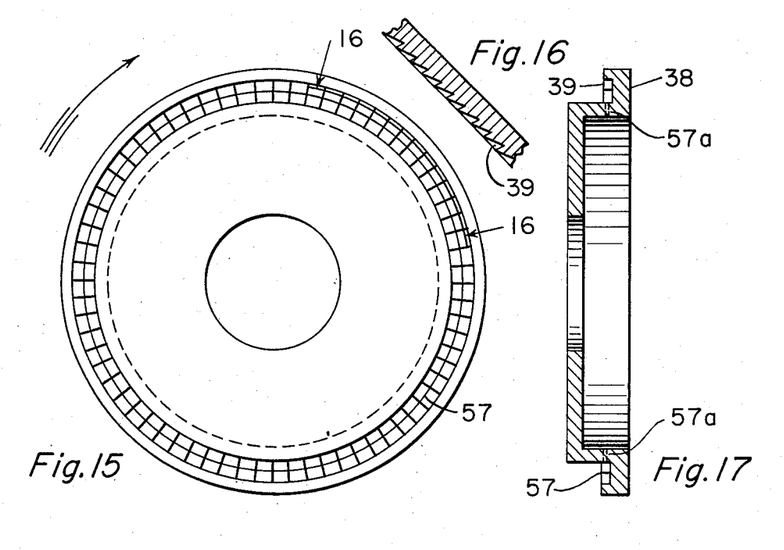
Fig. 15 is a detail face view of the turbine duct ring.
Fig. 16 is a fragmentary profile view of turbine duct ring taken on line 16—16 of Fig. 15.
Fig. 17 is a longitudinal axial cross-section of Fig. 15.

In Fig. 17, on turbine reactance wheel ducts 39, a divisional wall 57 for jet impingement, is provided in accordance with the width of turbine blading interstices 28, Fig. 10 and Fig. 7, where a narrow blading 28 does not necessarily fill a full duct 39 of the reactance turbine wheel Fig. 17. Therefore, a wall efficiently allows only a half of the duct 39 to be exposed to a narrow turbine blading 28 and its ensuing jet emerging therefrom. Since each turbine duct 39 reacts against a jet discharge while rotating and is fully charged to capacity, it loses this charge and is empty for the next revolution. This discharge loss occurs about a half revolution after charging, at which point a slight surface relief may be disposed, or there may be provided an elongated arcuate orifice 58, Fig. 10, in register with turbine reactance wheel ducts 39, through which passage the discharge is spent to emerge into the pressure chamber 21, Fig. 3.

Figure 8:
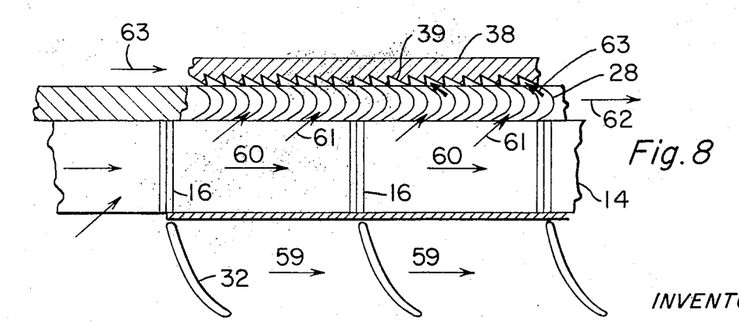
Fig. 8 is a diagrammatic plan showing forces of the scoop impeller, rotor and the elements of the turbine assembly employed in the invention.

The nucleus of the invention may be summed up in a diagrammatic sequence as illustrated in Fig. 8, wherein the scoop impeller blades 32 and their flow is denoted by arrows 59; rotor vanes 16 by directional flow arrows 60; turbine blading 28 which rotates only at flow speed arrows 61, and directionally as at 62, and the reaction flow arrows 63 impinging on turbine ducts 39 of the turbine reactance wheel 38 revolving as at 63, the latter in fixed relation to radial rotor 14 and impeller blades 32.

The pump action, as indicated in the compression chamber 21, Fig. 3, occurs only once every revolution, which principle is similar to that disclosed in my two previous patent applications, Serial No. 238,699 (now abandoned) and Serial No. 456,385.

Figure 4:
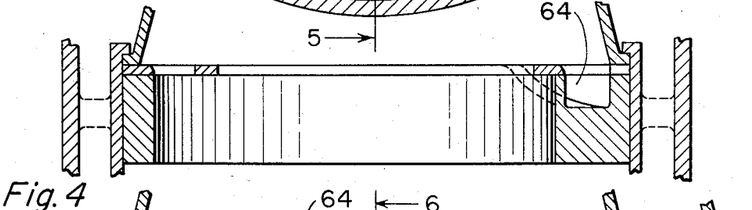
Fig. 4 is a cross-section taken along the line 4—4, Fig. 3 in the direction of the arrows.
Figure 5:
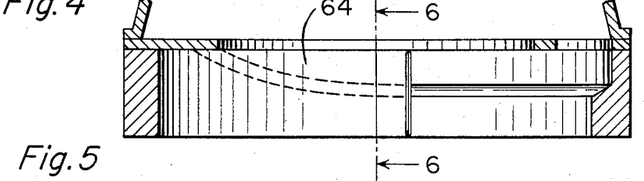
Fig. 5 is a cross-section taken along the line 5—5, Fig. 3 in the direction of the arrows.
Figure 6:
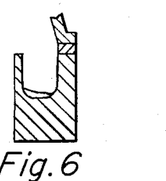
Fig. 6 is a fragmentary cross-section taken along the line 6—6, Fig. 5 in the direction of the arrows.

The difficulty involved in charging of the compression chamber 21, Fig. 3, which objective is performed by scoop impeller blades 32, Figs. 1 and 2, is that the latter needs an assist from an outpass or raceway 64, Figs. 3, 4 and 5, which gives the flow a greater degree of force for lodging or charging the compression chamber 21, through the arcuate aperture 24, which opening extends almost three-fourths of a cycle.

Figures 18, 19, 20:
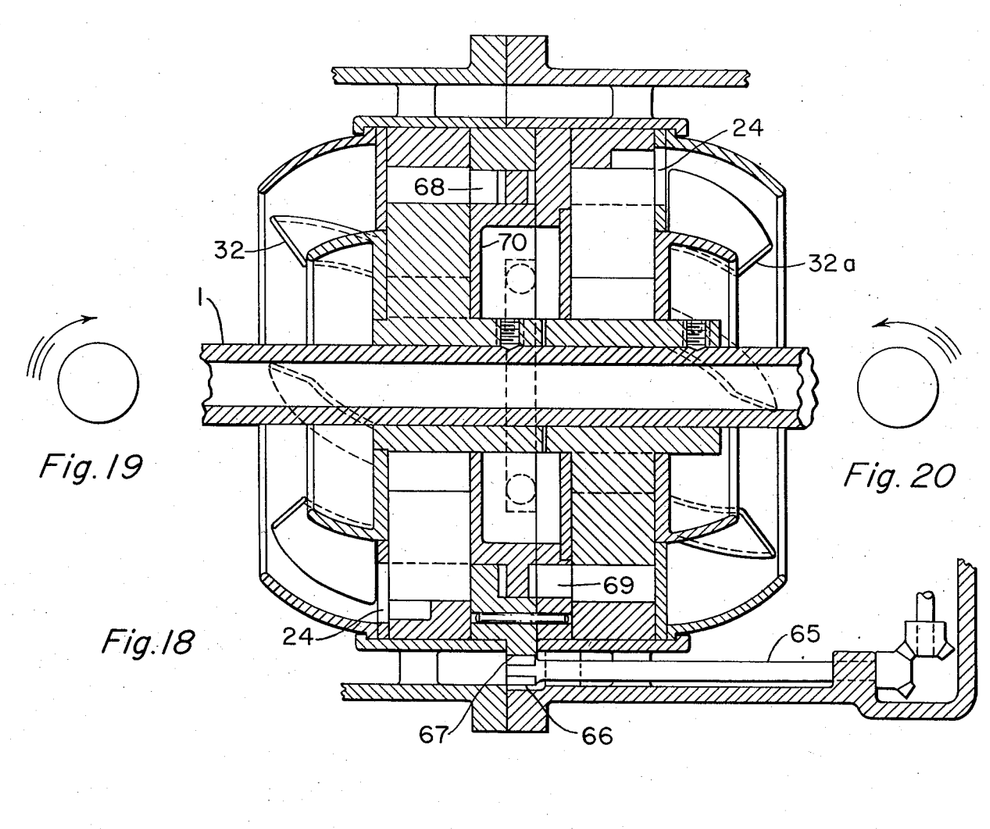
Fig. 18 is a transverse sectional view of a further modification of the instant invention.
Fig. 19 is a diagrammatic representation showing rotation of the shaft of Fig. 18 as viewed from the left.
Fig. 20 is a diagrammatic representation showing rotation of the shaft of Fig. 18 as viewed from the right.

In Fig. 18 another form of the invention is shown as consisting of left and right hand units having a control shaft 65, pinion 66 and rack 67, the latter regulating the dual turbine ring 68, with opposing compression jets 68 and 69, and the center turbine duct wheel 70. It is obvious that scoop blades 32, 32a rotate in the direction of the arrows of Figs. 19 and 20, which rotation is common.

Shaft 65 is linked up centrally as depicted in Fig. 1 for external speed regulation and employs similar speed locking means to prevent speed from changing.

The construction illustrated and described is susceptible of further modification without departing from the scope of my invention, as embodied in the appended claims.

Having thus described a preferred embodiment of my invention, what I claim as new and desire to secure by Letters Patent is set forth in the following claims:

1. An improved hydraulic clutch comprising, in combination, a hydraulic vessel, a driving shaft centrally journalled in said vessel, a rotor affixed to said shaft, a plurality of radially-extending vanes disposed circumferentially of said shaft and slidably retained within radially-extending slots in said rotor, a cam ring having an internal cam fixed with respect to said vessel, the outer ends of said vanes being in sliding contact with the internal cam surface of said cam ring, a scoop impeller affixed to said shaft at one side of said rotor and including a plurality of circumferentially disposed scoop blades in alignment with said vanes, a port disc between said scoop impeller and said rotor and comprising a wall at one side of said rotor, closure means at the other side of said rotor and cooperative with said port disc, said cam ring and said rotor to form expanding and contracting work chambers between said rotor vanes as said rotor is rotated with respect to said cam ring and said vessel, said port disc having an inlet passage for fluid communication between said vessel and work chambers during their expanding stage, a quantity of hydraulic fluid in said vessel, said scoop blades being in communication with said fluid and operative to deliver said fluid into said work chambers during their expanding stage, said closure means at the other side of said rotor comprising a turbine ring including a plurality of exhaust apertures extending through an arc of said turbine ring and defined by a plurality of arcuate turbine blades, said exhaust apertures being in communication with said work chambers during their contracting stage, said arcuate turbine blades being so curved as to direct the flow of discharge fluid opposite to the direction of rotation of said rotor to produce jet action, and manually adjustable means to rotate said turbine ring through a limited arc in register with the high point of said cam for closing off said apertures when said turbine ring is rotated with respect to said cam for controlling the rate of flow of fluid through said exhaust apertures, the torque of said driving shaft thereby being variably transmissible through said hydraulic fluid to said cam ring and means on the external periphery of said vessel for delivering transmitted torque.

2. A device according to claim 1, the apertures of said turbine ring extending arcuately through ninety degrees, said turbine ring being provided with an arcuate gear rack meshably engaged with an intermediate gear train, said gear train being engaged with said manually adjustable means, said manually adjustable means being journalled in said vessel.

3. A device according to claim 2, said manually adjustable means including a pressure relief valve in communication with the interior of said vessel, whereby excess air pressure within said vessel is released externally thereof.

4. An improved hydraulic clutch comprising in combination, a rotatably mounted cylindrical hydraulic vessel provided with circumferential power take-off means and containing hydraulic fluid, driving means axially journalled in said vessel and including a drive shaft, a cylindrical rotor affixed to said shaft and provided with radially-extending end-to-end slots, a flat vane slidably mounted in each of said slots, a cam ring fixed with respect to said vessel and surrounding said rotor and having an internal cam surface contactable with the outer ends of said vanes, whereby the radial disposition of said vanes is variably limited upon rotation of said rotor with respect to said cam ring, a scoop impeller affixed to said shaft at one side of said rotor and including a plurality of circumferentially disposed scoop blades in alignment with said vanes, a port disc between said scoop impeller and said rotor and comprising a wall at one side of said rotor, closure means at the other side of said rotor and cooperative with said port disc, said cam ring and said rotor to form expanding and contracting work chambers between said rotor vanes as said rotor is rotated with respect to said cam ring and said vessel, said port disc having an inlet passage for fluid communication between said vessel and work chambers during their expanding stage, a quantity of hydraulic fluid in said vessel, said scoop blades being in communication with said fluid and operative to deliver said fluid into said work chambers during their expanding stage, said closure means at the other side of said rotor comprising a turbine ring including a plurality of exhaust apertures extending through an arc of said turbine ring and defined by a plurality of arcuate turbine blades, said exhaust apertures being in communication with said work chambers during their contracting stage, said arcuate turbine blades being so curved as to direct the flow of discharge fluid opposite to the direction of rotation of said rotor to produce jet action, said manually adjustable means comprising an arcuate rack on said turbine ring and a pinion engaged with said rack.

5. A device according to claim 4, said pinion being provided with means communicating with the exterior of said vessel for adjusting said pinion externally of said vessel.

6. A device according to claim 4, said pinion being engaged with intermediate gear means, said gear means being meshably engaged with a second gear means journalled in said vessel and communicating with the exterior thereof, said second gear means being rotatable from the exterior of said vessel.

7. In a cylindrical hydraulic vessel containing hydraulic fluid, a drive shaft journalled in said vessel, a cylindrical rotor carried by said shaft and having a plurality of radially-extending end-to-end slots, radially slidable vanes in each of said slots, a cam ring having an internal cam surface fixed within said vessel and surrounding said rotor, the outer ends of said vanes being in sliding contact with the internal cam surface of said cam ring, a scoop impeller affixed to said shaft at one side of said rotor and including a plurality of circumferentially disposed scoop blades in alignment with said vanes, a port disc between said scoop impeller and said rotor and comprising a wall at one side of said rotor, closure means at the other side of said rotor and cooperative with said port disc, said cam ring and said rotor to form expanding and contracting work chambers between said rotor vanes as said rotor is rotated with respect to said cam ring and said vessel, said port disc having an inlet passage for fluid communication between said vessel and work chambers during their expanding stage, said scoop blades being in communication with said fluid and operative to deliver said fluid into said work chambers during their expanding stage, said closure means at the other side of said rotor comprising a turbine ring including a plurality of exhaust apertures extending through an arc of said turbine ring and defined by a plurality of arcuate turbine blades, said exhaust apertures being in communication with said work chambers during their contracting stage, said arcuate turbine blades being so curved as to direct the flow of discharge fluid opposite to the direction of rotation of said rotor to produce jet action, and manually adjustable means to rotate said turbine ring through a limited arc in register with the high point of said cam for closing off said apertures when said turbine ring is rotated with respect to said cam for controlling the rate of flow of fluid through said exhaust apertures, the torque of said driving shaft thereby being variably transmissible through said hydraulic fluid to said cam ring and power take-off means on said vessel for delivering transmitted torque.

8. A device according to claim 7, including mechanism for controlling said manually-adjustable means externally of said vessel.

9. A device according to claim 8 wherein said controlling mechanism comprises an arcuate rack on said turbine ring and a pinion engaged with said rack.

10. An improved hydraulic clutch comprising, in combination, a rotatably mounted cylindrical hydraulic vessel provided with external power take-off means and containing hydraulic fluid, a ring cam having an internal cam surface within said vessel and fixed thereto for rotation with said vessel, a drive shaft rotatably journalled axially within said vessel, a cylindrical rotor carried by said shaft and surrounded by said internal cam surface, a plurality of radially-extending slots formed end-to-end in said rotor, flat vane members slidably disposed in each of said slots and adapted to be reciprocally moved by said internal cam surface upon rotation of said rotor with respect to said vessel, a scoop impeller affixed to said shaft at one side of said rotor and including a plurality of circumferentially disposed scoop blades in alignment with said vanes, a port disc between said scoop impeller and said rotor and comprising a wall at one side of said rotor, closure means at the other side of said rotor and cooperative with said port disc, said cam ring and said rotor to form expanding and contracting work chambers between said rotor vanes as said rotor is rotated with respect to said cam ring and said vessel, said port disc having an inlet passage for fluid communication between said vessel and work chambers during their expanding stage, said scoop blades being in communication with said fluid and operative to deliver said fluid into said work chambers during their expanding stage, said closure means at the other side of said rotor comprising a turbine ring including a plurality of exhaust apertures extending through an arc of said turbine ring and defined by a plurality of arcuate turbine blades, said exhaust apertures being in communication with said work chambers during their contracting stage, said arcuate turbine blades being so curved as to direct the flow of discharge fluid opposite to the direction of rotation of said rotor to produce jet action, said closure means at the other side of said rotor further comprising a turbine wheel fixed to said rotor and having an annular formation of duct surfaces in register with said exhaust apertures and against which said jet exhausted fluid is adapted to react, and manually adjustable means to rotate said turbine ring through a limited arc in register with the high point of said cam for closing off said apertures when said turbine ring is rotated with respect to said cam for controlling the rate of flow of fluid through said exhaust apertures, the torque of said driving shaft thereby being variably transmissible through said hydraulic fluid to said cam ring.

References Cited in the file of this patent

UNITED STATES PATENTS

| | | |
|---|---|---|
| 1,952,354 | Bedford | Mar. 27, 1934 |
| 2,034,702 | McClelland | Mar. 24, 1936 |
| 2,502,364 | Bannister | Mar. 28, 1950 |
| 2,511,135 | Torrance | June 13, 1950 |